United States Patent
Kamakura

(10) Patent No.: US 8,782,758 B2
(45) Date of Patent: Jul. 15, 2014

(54) BIOMETRIC AUTHENTICATION SYSTEM, BIOMETRIC AUTHENTICATION SERVER, METHOD AND PROGRAM THEREOF

(75) Inventor: Ken Kamakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 116 days.

(21) Appl. No.: 13/225,738

(22) Filed: Sep. 6, 2011

(65) Prior Publication Data

US 2012/0079579 A1    Mar. 29, 2012

(30) Foreign Application Priority Data

Sep. 27, 2010   (JP) ................................. 2010-214695

(51) Int. Cl.
*G06F 7/04*     (2006.01)
*G06F 21/00*    (2013.01)

(52) U.S. Cl.
USPC .................... 726/6; 726/5; 713/182; 713/186

(58) Field of Classification Search
USPC ............................ 713/182, 186; 726/2–10, 21
See application file for complete search history.

(56) References Cited

U.S. PATENT DOCUMENTS

| | | | | |
|---|---|---|---|---|
| 5,802,199 | A * | 9/1998 | Pare et al. ...................... | 382/115 |
| 6,311,272 | B1 * | 10/2001 | Gressel .......................... | 713/186 |
| 6,978,381 | B1 * | 12/2005 | Te et al. ........................ | 726/18 |
| 2002/0026427 | A1 * | 2/2002 | Kon et al. ....................... | 705/67 |
| 2003/0088782 | A1 * | 5/2003 | Forrest .......................... | 713/186 |
| 2004/0010697 | A1 * | 1/2004 | White ............................ | 713/186 |
| 2004/0230800 | A1 * | 11/2004 | Futa et al. ...................... | 713/169 |
| 2005/0289644 | A1 * | 12/2005 | Wray ............................. | 726/5 |
| 2006/0005025 | A1 * | 1/2006 | Okada et al. ................... | 713/168 |
| 2006/0104485 | A1 * | 5/2006 | Miller et al. ................... | 382/115 |
| 2007/0094501 | A1 * | 4/2007 | Takamizawa et al. ........ | 713/170 |
| 2007/0094509 | A1 * | 4/2007 | Wei et al. ...................... | 713/176 |
| 2007/0283164 | A1 * | 12/2007 | Nishizawa et al. ........... | 713/186 |
| 2007/0288748 | A1 * | 12/2007 | Kakiuchi et al. .............. | 713/159 |
| 2008/0013795 | A1 * | 1/2008 | Ito et al. ........................ | 382/115 |
| 2008/0031496 | A1 * | 2/2008 | Takagi .......................... | 382/115 |
| 2008/0098469 | A1 * | 4/2008 | Morijiri et al. ................. | 726/5 |
| 2008/0159598 | A1 | 7/2008 | Iasso | |
| 2009/0097657 | A1 * | 4/2009 | Scheidt et al. ............... | 380/277 |
| 2009/0113560 | A1 * | 4/2009 | Kori et al. ...................... | 726/29 |

(Continued)

FOREIGN PATENT DOCUMENTS

| | | |
|---|---|---|
| EP | 2 352 108 | 8/2011 |
| JP | 2001-256191 | 9/2001 |

(Continued)

OTHER PUBLICATIONS

European Search Report issued Jan. 23, 2012 in corresponding EP Patent Application No. 11181205.3.

*Primary Examiner* — Darren B Schwartz
(74) *Attorney, Agent, or Firm* — Staas & Halsey LLP

(57) ABSTRACT

An authentication system in which a authentication server and a plurality of clients are coupled through a network and configured to process an authentication from a user of a client, is configured to determine as a cache target user another user who is different from the user who requested the authentication; is configured to generate an identifier that indicates the cache target user; and is configured to transmit biometric data of the cache target user and the identifier to the client from which the authentication of the user was requested. A cache availability determiner can determine whether biometric data of any cache target user are available on a client.

14 Claims, 11 Drawing Sheets

(56) References Cited

U.S. PATENT DOCUMENTS

| | | |
|---|---|---|
| 2009/0209242 A1* | 8/2009 | Chin .............................. 455/416 |
| 2009/0287930 A1* | 11/2009 | Nagaraja ....................... 713/171 |
| 2010/0161654 A1* | 6/2010 | Levy .............................. 707/769 |
| 2010/0223663 A1* | 9/2010 | Morimoto et al. ................. 726/7 |
| 2010/0316262 A1* | 12/2010 | Kuwahara ..................... 382/115 |
| 2011/0202985 A1* | 8/2011 | Kamakura ........................ 726/7 |

FOREIGN PATENT DOCUMENTS

| | | |
|---|---|---|
| JP | 2003-044442 | 2/2003 |
| JP | 2005-142848 | 6/2005 |
| WO | 2006/055575 | 5/2006 |

* cited by examiner

FIG. 7A

| USER NAME | GROUP TO WHICH USER BELONGS |
|---|---|
| ADMINISTRATIVE USER A1 | GROUP A ADMINISTRATOR |
| ADMINISTRATIVE USER A2 | GROUP A ADMINISTRATOR |
| ADMINISTRATIVE USER A3 | GROUP A ADMINISTRATOR |
| ADMINISTRATIVE USER A1 | GROUP A |
| ADMINISTRATIVE USER A2 | GROUP A |
| ADMINISTRATIVE USER A3 | GROUP A |
| USER A_001 | GROUP A |
| USER A_002 | GROUP A |
| USER A_003 | GROUP A |
| USER A_004 | GROUP A |
| USER A_005 | GROUP A |
| ⋮ | ⋮ |

FIG. 7B

| CACHE AVAILABLE GROUP |
|---|
| GROUP A ADMINISTRATOR |
| ⋮ |

FIG. 7C

| ADMINISTRATIVE GROUP | DEPENDENT GROUP |
|---|---|
| GROUP A ADMINISTRATOR | GROUP A |
| ⋮ | ⋮ |

FIG. 8

| USER NAME | CLIENT INFORMATION | CACHE AVAILABILITY ATTRIBUTE |
|---|---|---|
| ADMINISTRATIVE USER A1 | aaa.bbb.ccc.10 | AVAILABLE |
| ADMINISTRATIVE USER A1 | aaa.bbb.ccc.11 | AVAILABLE |
| ADMINISTRATIVE USER A1 | aaa.bbb.ccc.12 | UNAVAILABLE |
| ADMINISTRATIVE USER A2 | aaa.bbb.ccc.21 | AVAILABLE |
| ADMINISTRATIVE USER A2 | aaa.bbb.ccc.22 | AVAILABLE |
| ADMINISTRATIVE USER A3 | aaa.bbb.ccc.30 | AVAILABLE |
| ⋮ | ⋮ | ⋮ |

FIG. 9

| USER NAME | TEMPORARY ID | KEY | CACHE DESTINATION ADDRESS | PRIORITY |
|---|---|---|---|---|
| USER A_001 | S2f4P5k4W1t6A5z | K2e9T0... | aaa.bbb.ccc.11 | 2 |
| USER A_001 | 9I8w4x7z6i7q0o5 | Z8t6I5... | aaa.bbb.ccc.10 | 1 |
| ... | ... | ... | ... | ... |

FIG. 11A

| USER NAME | CLIENT INFORMATION | NETWORK SEGMENT |
|---|---|---|
| USER A | aaa.bbb.sss.1 | GROUP S |
| USER B | aaa.bbb.sss.2 | GROUP S |
| USER C | aaa.bbb.ttt.1 | GROUP T |
| ⋮ | ⋮ | ⋮ |

FIG. 11B

| USER NAME | AUTHENTICATION RESULT | TIME INFORMATION |
|---|---|---|
| USER B | SUCCESS | YYYY/MM/DD hh:mm:ss. ss1 |
| USER A | SUCCESS | YYYY/MM/DD hh:mm:ss. ss2 |
| USER A | SUCCESS | YYYY/MM/DD hh:mm:ss. ss3 |
| USER B | FAILURE | YYYY/MM/DD hh:mm:ss. ss4 |
| USER C | SUCCESS | YYYY/MM/DD hh:mm:ss. ss5 |
| ⋮ | ⋮ | ⋮ |

FIG. 11C

| USER NAME | AUTHENTICATION RATE |
|---|---|
| USER A | 0.85 |
| USER B | 0.40 |
| USER C | 0.91 |
| USER D | 0.95 |
| USER E | 0.70 |
| USER F | 0.55 |
| ⋮ | ⋮ | ant

BIOMETRIC AUTHENTICATION SYSTEM, BIOMETRIC AUTHENTICATION SERVER, METHOD AND PROGRAM THEREOF

CROSS-REFERENCE TO RELATED APPLICATIONS

This application is based upon and claims the benefit of priority of the prior Japanese Patent Application No. 2010-214695, filed on Sep. 27, 2010, the entire contents of which are incorporated herein by reference.

FIELD

The embodiments discussed herein are related to a biometric authentication system to perform a biometric authentication.

BACKGROUND

In order to address concentration of accesses by clients in a client-server system, a cluster method is proposed in which a plurality of servers mutually collaborates to share the load. Compared with personal authentication systems that use a password and/or a Personal Identification Number (PIN), biometric authentication systems that perform biometric authentications generally have a large authentication processing load. Accordingly, the biometric authentication system may share the load by the cluster method according to the size (number) of clients.

Although clustering of servers achieves a certain effect to share the load, expected performance may not be achieved depending on how much authentication requests are concentrated on at specific time. Accordingly, a technique is proposed in which authentication data is registered in a cache memory of a client and so on and verification is performed by using the authentication data registered in the cache memory, and thereby reducing, if not preventing, to cause an excessive load to servers or the network. Moreover, the following technique is proposed. According to the technique, a certain pieces of authentication data is stored in a database (DB) of a device that is different from a server that retain all of the authentication data, verification is performed using the certain piece of authentication data. As a result, authentication requests that are assumed to be failed on the server are reduced and an excessive load to the server may be reduced, if not prevented (for example, Japanese Laid-open Patent Publication No. 2003-44442, Japanese Laid-open Patent Publication No. 2001-256191 and Japanese Laid-open Patent Publication No. 2005-142848).

SUMMARY

In accordance with an aspect of the embodiments, an authentication system in which a authentication server and a plurality of clients are coupled through a network and configured to process an authentication request from a user of a client, is configured to determine as a cache target user another user who is different from the user who requested the authentication; is configured to generate an identifier that indicates the cache target user; and is configured to transmit biometric data of the cache target user and the identifier to the client from which the authentication of the user was requested. A cache availability determiner can determine whether biometric data of any cache target users are available on a client.

The object and advantages of the invention will be realized and attained by at least the features, elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 7A illustrates an example of a relationship between a user name and a group to which the user belongs;

FIG. 7B illustrates an example of a cache available group;

FIG. 7C illustrates an example of a relationship between an administrative group and a dependent group;

FIG. 8 illustrates an example of cache availability attribute information;

FIG. 9 illustrates an example of client information to which priority is assigned;

FIG. 11A illustrates an example of network group information;

FIG. 11B illustrates an example of an authentication log; and

FIG. 11C illustrates an authentication rate for each user.

DESCRIPTION OF EMBODIMENTS

As described above, if biometric data of a user is almost always cached to a specific client, integrity of authentication data may not be ensured depending on power status of the client. Furthermore, if authentication data is cached to another specific device that is different from a server retaining all authentication data, the load to the specific device is greatly increased. Moreover, there is a drawback in which the load to the server is not shared.

Hereinafter, one embodiment of the present disclosure to address the above issues will be described by referring to accompanying drawings.

Figure 1:
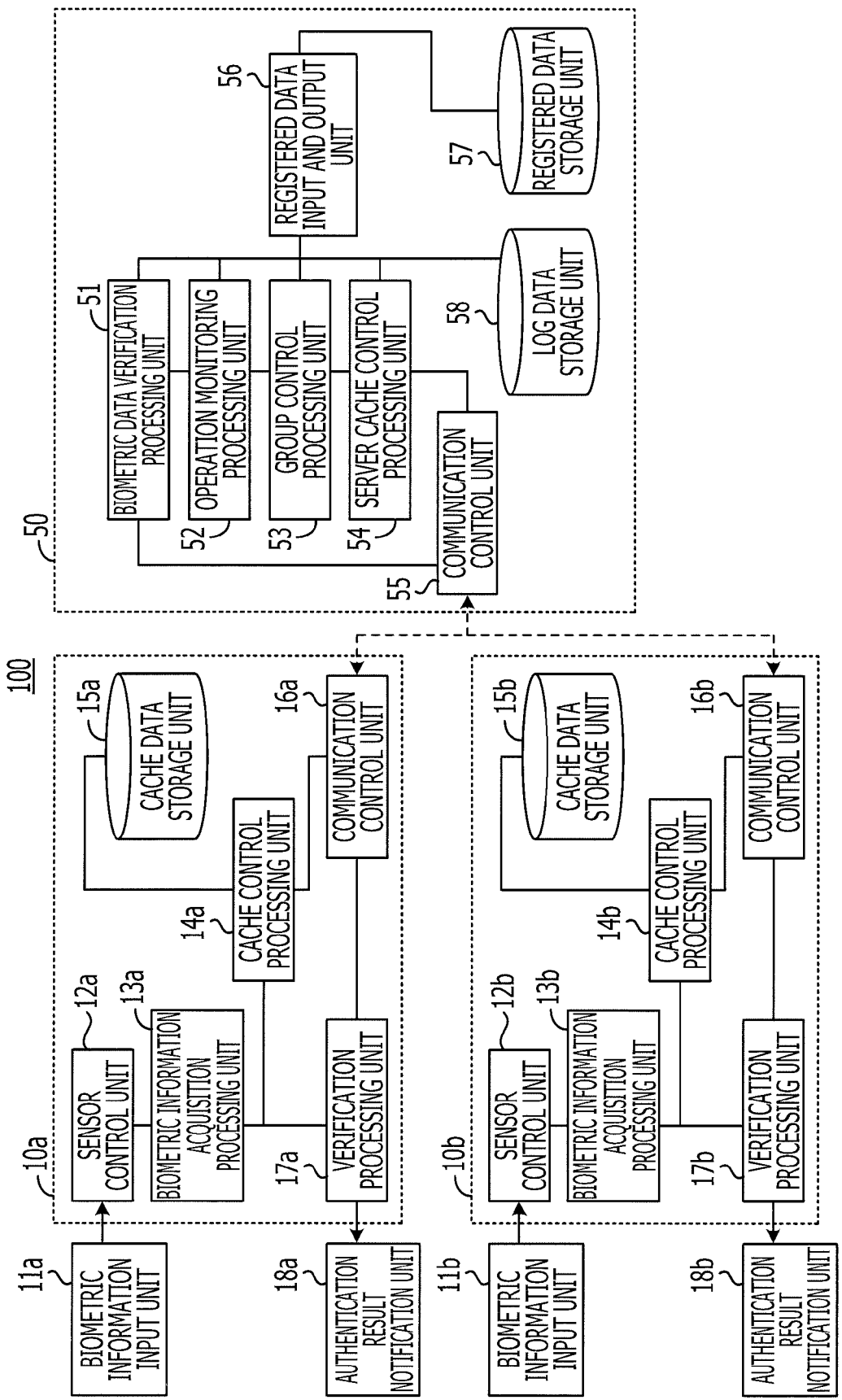
FIG. 1 is a block diagram illustrating an apparatus configuration of a biometric authentication system.

(Biometric authentication system) An example of an apparatus configuration of a biometric authentication system 100 according to each embodiment will be described by referring to FIG. 1. FIG. 1 is a block diagram illustrating an apparatus configuration of the biometric authentication system 100.

As illustrated in FIG. 1, the biometric authentication system 100 includes a client 10a, a client 10b, and a biometric authentication server 50.

Configurations of the client 10a and a client 10b will be described.

The client 10a includes a sensor control unit 12a, a biometric information acquisition processing unit 13a, a cache control processing unit 14a, a cache data storage unit 15a, a communication control unit 16a, and a verification processing unit 17a. A biometric information input unit 11a and an authentication result notification unit 18a are coupled to the client 10a.

The client 10b includes a sensor control unit 12b, a biometric information acquisition processing unit 13b, a cache control processing unit 14b, a cache data storage unit 15b, a communication control unit 16b, and a verification processing unit 17b. Hereinafter, when the client 10a and the client 10b are not distinguished, the client 10a and the client 10b are described as "client 10" and the components are indicated without any alphabet.

The biometric information input unit 11 inputs biometric information and a user ID. The biometric information input unit 11 includes a sensor, for example, an image sensor, and an input device such as a keyboard and a card reader. A user inputs biometric information through the sensor and inputs the user ID through the input device when the user requests his or her authentication. The biometric information is, for example, fingerprint and palm vein.

The sensor control unit 12, the biometric information acquisition processing unit 13, the cache control processing unit 14, the communication control unit 16, and the verification processing unit 17 are achieved, for example, by execution of a program by a Central Processing Unit (CPU). Furthermore, the cache data storage unit 15 is achieved, for example, by a storage device such as a hard disk.

The sensor control unit 12 takes biometric information and a user ID that are input to the biometric information input unit 11 into the client 10. The biometric information acquisition processing unit 13 acquires biometric data for verification that complies with an authentication method of the biometric authentication system 100 from the biometric information. The communication control unit 16 controls transmission and reception of data between the biometric authentication server 50 and other clients. The cache control processing unit 14 performs processing of data stored in the cache data storage unit 15. The verification processing unit 17 performs processing relating to verification of biometric data.

The biometric authentication result notification unit 18 is, for example, a display, and notifies a user of a result of verification conducted by the verification processing unit 17.

A configuration of the biometric authentication server 50 will be described.

The biometric authentication server 50 includes a biometric data verification processing unit 51, an operation monitoring processing unit 52, a group control processing unit 53, a server cache control processing unit 54, a communication control unit 55, a registered data input and output unit 56, a registered data storage unit 57, and a log data storage unit 58.

The biometric data verification processing unit 51, the operation monitoring processing unit 52, the group control processing unit 53, the server cache control processing unit 54, and the communication control unit 55 are achieved, for example, by execution of a program by a CPU. The registered data storage unit 57 and the log data storage unit 58 are achieved, for example, by a storage device such as a hard disk.

The communication control unit 55 controls transmission and reception of data between the client 10a and the client 10b. The registered data storage unit 57 stores a plurality of pieces of biometric data. The registered data input and output unit 56 inputs and outputs biometric data stored in the registered data storage unit 57. The biometric data verification processing unit 51 checks the biometric data for verification that is received through the communication control unit 55 against biometric data stored in the registered data storage unit 57. The operation monitoring processing unit 52 monitors operations of the biometric authentication system 100. The group control processing unit 53 performs, for example, processing to generate a group to which a user who requests an authentication belongs. The server cache control processing unit 54 processes data stored in the registered data storage unit 57.

When a user requests an authentication through the client 10 in the above-described biometric authentication system 100, the biometric authentication method according to each embodiment described below will be executed. Hereinafter, each embodiment will be described.

First Embodiment

An authentication method according to the first embodiment will be described. According to the first embodiment, a biometric authentication server 50 makes a client 10 cache biometric data of another user who is different from a user who requests an authentication. Hereinafter, specific descriptions will be made by referring to FIG. 2.

Figure 2:
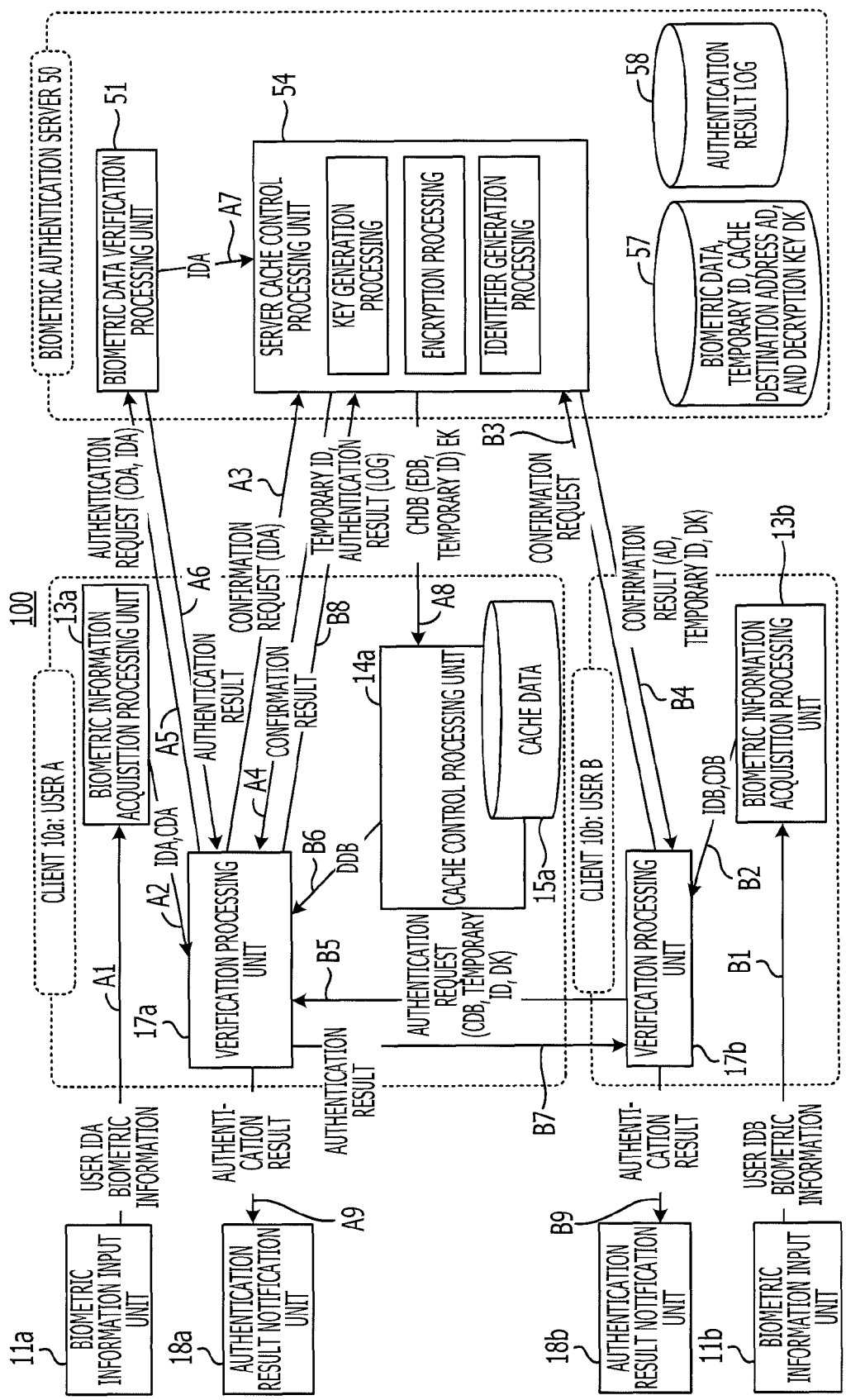
FIG. 2 is a schematic diagram illustrating an example of an authentication method according to a first embodiment.

FIG. 2 is a schematic diagram illustrating an example of an authentication method according to the first embodiment in a biometric authentication system 100. In the example of FIG. 2, a user A requests an authentication from the client 10a and a user B requests an authentication from the client 10b. The authentication method for the user A and that for the user B will be described below.

The authentication method for the user A is described. Here, it is assumed that biometric data of the user A is not cached to any of the client 10a and the client 10b.

The user A inputs biometric information and a user ID to the client 10a. For example, the user A inputs the biometric information and the user ID from the biometric information input unit 11a (the arrow A1). The sensor control unit 12a takes the input biometric information and the user ID into the client 10a. Hereinafter, the input user ID of the user A is referred to as the "user IDA." When the biometric information of the user A and the user IDA are input to the client 10a, the biometric information acquisition processing unit 13a acquires biometric data for verification that complies with the authentication method of the biometric authentication system 100 from the biometric information. Hereinafter, the biometric data for verification acquired from the biometric information of the user A is referred to as the "biometric data for verification CDA." The biometric information acquisition processing unit 13a transmits the user IDA and the biometric data for verification CDA to the verification processing unit 17a (the arrow A2).

The verification processing unit 17a confirms the biometric authentication server 50 whether the biometric data of the user A is cached to any client. For example, the verification processing unit 17a transmits a confirmation request that includes the user IDA to the biometric authentication server 50 (the arrow A3).

When the biometric data is cached to any of the clients, information such as a client address of the cache destination (hereinafter, referred to as a "cache destination address") is stored in the registered data storage unit 57 of the biometric authentication server 50, which will be described in detail later. Therefore, when the server cache control processing unit 54 receives the confirmation request, the server cache control processing unit 54 searches the registered data storage unit 57 through the registered data input and output unit 56 based on the user IDA and confirms whether any of the clients caches the biometric data of the user A. When the server cache control processing unit 54 completes the confirmation, the server cache control processing unit 54 transmits the confirmation result to the client 10*a* (the arrow A4). Here, the biometric data of the user A is not stored in any of the client 10*a* or the client 10*b*. Hence, the server cache control processing unit 54 transmits the confirmation result to the client 10*a* that indicates the biometric data of the user A is not cached to any of the clients.

When the verification processing unit 17*a* of the client 10*a* receives the confirmation result that indicates the biometric data of the user A is not cached to any of the clients, the verification processing unit 17*a* transmits an authentication request to the biometric authentication server 50. For example, the verification processing unit 17*a* transmits an authentication request that includes the user IDA and the biometric data for verification CDA to the biometric authentication server 50 (the arrow A5).

The biometric data verification processing unit 51 of the biometric authentication server 50 acquires biometric data DDA of the user A from the registered data storage unit 57 based on the user IDA through the registered data input and output unit 56. The biometric data verification processing unit 51 performs authentication processing by checking the biometric data for verification CDA against the biometric data DDA of the user A. The biometric data verification processing unit 51 transmits the authentication result to the client 10*a* (the arrow A6). The biometric data verification processing unit 51 transmits the user IDA to the server cache control processing unit 54 if the authentication succeeds (the arrow A7).

When the server cache control processing unit 54 receives the user IDA, the server cache control processing unit 54 determines biometric data to be cached to the client 10*a*. As a method to determine biometric data to be cached, the server cache control processing unit 54 determines a user different from the user of the client that transmits the authentication request as a cache target user and biometric data of the cache target user is assumed to be a cache target. Here, the server cache control processing unit 54 determines a user B different from the user A of the client 10*a* as a cache target user and biometric data of the user B is assumed to be a cache target. The server cache control processing unit 54 acquires cache target biometric data, in this case, biometric data DDB of the user B from the registered data storage unit 57. Thus, the server cache control processing unit 54 functions as a cache target user determination unit.

The server cache control processing unit 54 generates a pair of keys that performs encryption and decryption, in other words, an encryption key EK and a decryption key DK. The server cache control processing unit 54 encrypts the biometric data DDB of the user B by using the encryption key EK. Hereinafter, encrypted biometric data is referred to as "encrypted biometric data." Moreover, the server cache control processing unit 54 generates a temporary ID that is an identifier indicating the encrypted biometric data is for the user B. The temporary ID is generated as an ID that may not be identified user on a client. In other words, even if the user A sees the temporary ID, the user A may not identify whose biometric data corresponds to the temporary ID (refer to FIG. 9). In other words, the server cache control processing unit 54 generates the temporary ID that is obtained by encrypting the identifier from which the user B may be identified in addition to generate the encrypted biometric data EDB that is obtained by encrypting the biometric data DDB of the user B. Accordingly, the server cache control processing unit 54 functions as an identifier generation unit and an encryption unit. Here, the server cache control processing unit 54 generates a key and a temporary ID whenever the server cache control processing unit 54 acquires biometric data from the registered data storage unit 57. In other words, whenever biometric data is acquired by the registered data storage unit 57, even when the same biometric data is acquired, the biometric data is encrypted by using different keys.

The server cache control processing unit 54 transmits the encrypted biometric data EDB of the user B, the temporary ID, and the encryption key EK to the client 10*a* (the arrow A8). Hereinafter, the encrypted biometric data EDB, the temporary ID, and the encryption key EK are collectively referred to as "cache data CHDB." At this time, the server cache control processing unit 54 makes the registered data storage unit 57 store a cache destination address AD (here, an address of the client 10*a*), the temporary ID, and a decryption key DK of the biometric data of the user B.

The cache control processing unit 14*a* of the client 10*a* makes the cache data storage unit 15*a* cache the received cache data CHDB of the user B. Furthermore, the verification processing unit 17*a* transmits an authentication result of the user A received from the biometric data verification processing unit 51 of the biometric authentication server 50 to the authentication result notification unit 18*a* (the arrow A9). Accordingly, the authentication result is provided to the user A.

The authentication method of the user B will be described.

The user B inputs the biometric information and the user ID to the client 10*b*. For example, the user B inputs the biometric information and the user ID from the biometric information input unit 11*b* (the arrow B1). The sensor control unit 12*b* takes the input biometric information and the user ID into the client 10*b*. Hereinafter, the input user ID of the user B is referred to as the "user IDB." When the biometric information of the user B and the user IDB are input to the client 10*b*, the biometric information acquisition processing unit 13*b* acquires biometric data for verification that complies with the authentication method of the biometric authentication system 100 from the biometric information. Hereinafter, the biometric data for verification acquired from the biometric information of the user B is referred to as the "biometric data for verification CDB." The biometric information acquisition processing unit 13*b* inputs the user IDB and the biometric data for verification CDB to the verification processing unit 17*b* (the arrow B2).

The verification processing unit 17*b* confirms with the biometric authentication server 50 whether the biometric data of the user B is cached to any of the clients. For example, the verification processing unit 17*b* transmits a confirmation request that includes the user IDB to the biometric authentication server 50 (the arrow B3).

When the server cache control processing unit 54 of the biometric authentication server 50 receives the confirmation request from the client 10*b*, the server cache control processing unit 54 searches the registered data storage unit 57 through the registered data input and output unit 56 based on the user IDB and confirms whether any of the clients caches the biometric data of the user B. Here, as described above, the registered data storage unit 57 stores a cache destination address AD (here, an address of the client 10*a*) of the encrypted data of the user B, a temporary ID and a decryption key DK for the encrypted data. Accordingly, the server cache control processing unit 54 transmits the cache destination address AD, the temporary ID, and the decryption key DK to the client 10*b* as the confirmation result (the arrow B4).

When the verification processing unit 17*b* of the client 10*b* recognizes that the biometric data of the user B is cached to the client 10*a* based on the received cache destination address AD, the verification processing unit 17*b* transmits an authentication request to the client 10a. For example, the verification processing unit 17b transmits an authentication request that includes the biometric data for verification CDB, the temporary ID, and the decryption key DK to the client 10a (the arrow B5).

The verification processing unit 17a of the client 10a receives the biometric data for verification CDB, the temporary ID, and the decryption key DK. The verification processing unit 17a transmits the temporary ID, and the decryption key DK to the cache control processing unit 14a. The cache control processing unit 14a acquires the cache data CHDB of the user B from the cache data storage unit 15a by using the temporary ID. The cache control processing unit 14a decrypts the encrypted biometric data EDB in the cache data CHDB of the user B by using the decryption key DK. The cache control processing unit 14a transmits the decrypted biometric data DDB of the user B to the verification processing unit 17a (the arrow B6). The verification processing unit 17a performs authentication processing by checking the biometric data for verification CDB against the biometric data DDB of the user B. The verification processing unit 17a transmits the temporary ID and the authentication result to the biometric authentication server 50 (the arrow B8). The server cache control processing unit 54 of the biometric authentication server 50 records the authentication result in the log data storage unit 58 as a log. Moreover, the verification processing unit 17a transmits the authentication result to the client 10b (the arrow B7).

The verification processing unit 17b of the client 10b transmits the authentication result of the user B to the authentication result notification unit 18b (the arrow B9). Accordingly, the authentication result is provided to the user B.

As described above, the biometric authentication system 100 performs an authentication for the user B by assuming the client 10a that is a cache destination client as a server. The method may reduce an authentication load to the biometric authentication server 50. Furthermore, the client 10b does not need to transmit the biometric data for verification CDB to the biometric authentication server 50 as long as the cache data of the user B is cached to the client 10a. Accordingly, a communication load between the client 10b and the biometric authentication server 50 may be reduced without adding any device.

Particularly, the biometric authentication system 100 caches biometric data of the user B, who is different from the user A who requests an authentication, to the client 10a. As a result, choice of biometric data to be cached may be increased compared with when biometric data of a user who requests an authentication is almost always cached to the client of the user. In other words, as the number of authentication requests to the biometric authentication server 50 increases, cache data of more users may be cached to greater number of the clients. Accordingly, a load to the biometric server or that to the specific client may be effectively reduced, if not prevented.

Here, the biometric data of the user B is stored in the client 10a after applying encryption and the temporary ID of the biometric data is set so as not to be identified user B on the client 10a. Accordingly, the biometric data that is cached to the client 10a may be in a state that may not be identified as the biometric data of the user B.

After completing the authentication processing of the user B, the verification processing unit 17a of the client 10a transmits the authentication result of the user B to the client 10b and transmits the authentication result of the user B and the temporary ID to the biometric authentication server 50 as well. Thus, the verification processing unit 17a functions as an authentication result notification unit. The server cache control processing unit 54 of the biometric authentication server 50 stores the authentication result in the log data storage unit 58 as a log. At this time, the server cache control processing unit 54 converts the temporary ID into a user identifier by which the system administrator may identify the user, for example, the user name and stores the user identifier by associating with the authentication result. For example, the server cache control processing unit 54 may have relationship information such as a map that indicates a relationship between a temporary ID and a user identifier, and the server cache control processing unit 54 converts the temporary ID into the user identifier by using the relationship information. Accordingly, the cache destination client may notify the biometric authentication server of the authentication result by using the temporary ID. As a result, anonymity may be maintained at the cache destination client. Meanwhile, in the biometric authentication server, the system administrator may check the authentication result that is associated with a user identifier by which the system administrator may identify the user.

Figure 3:
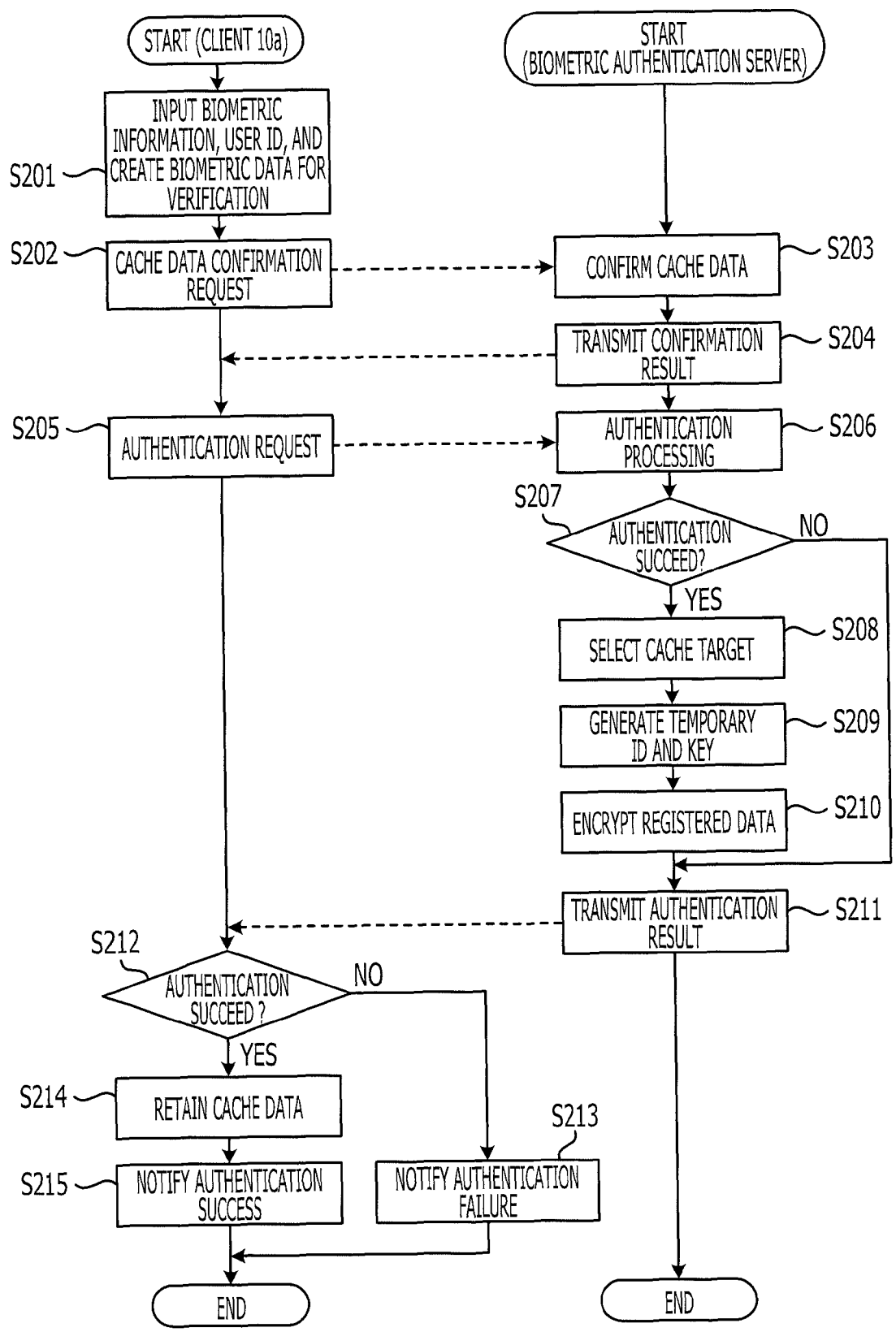
FIG. 3 is a flowchart of authentication processing that includes cache processing of cache data.
Figure 4:
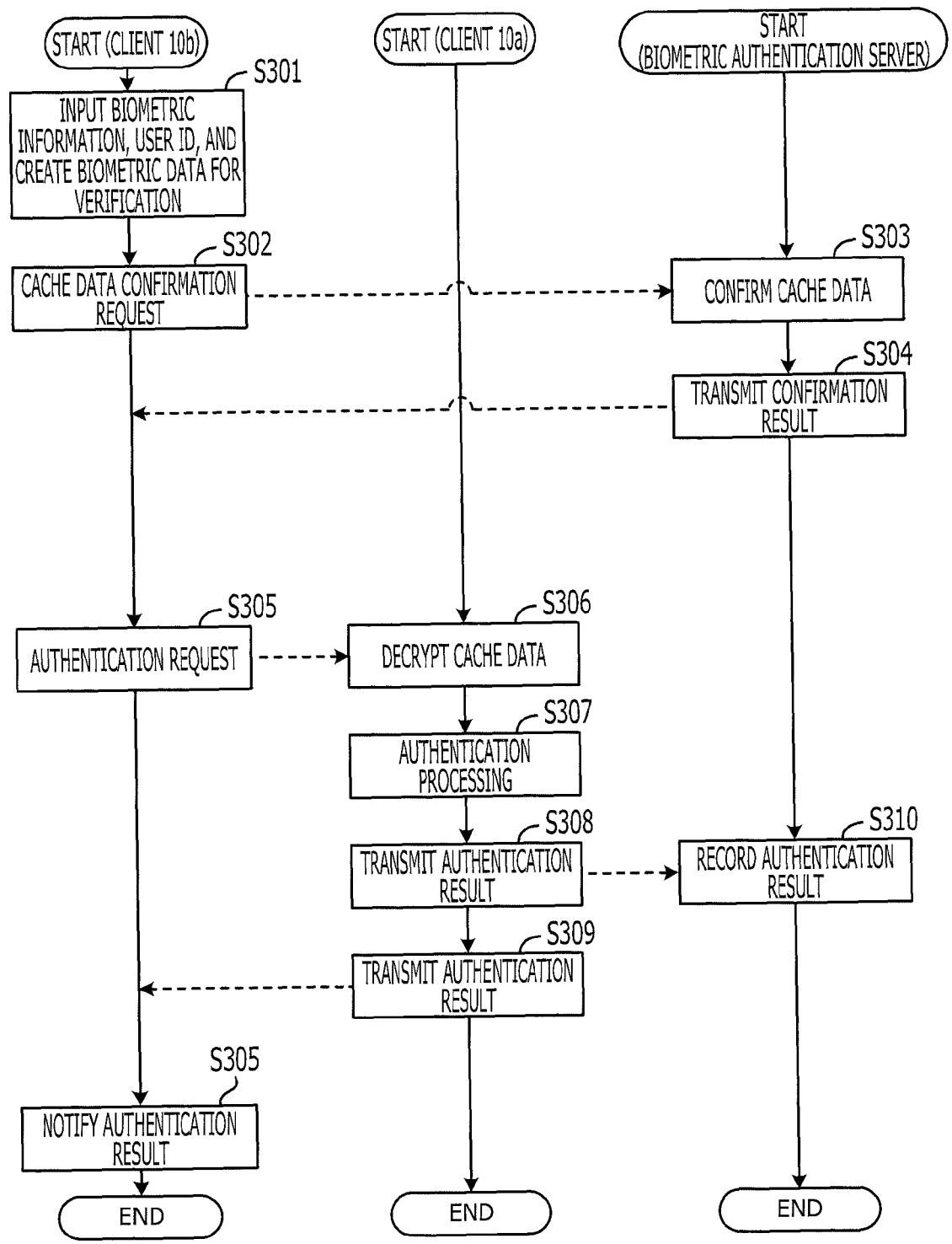
FIG. 4 is a flowchart of authentication processing that uses cache data.

The above-described authentication method according to the first embodiment will be described by referring to the flowcharts in FIGS. 3 and 4. FIG. 3 is a flowchart of authentication processing of the user A that includes cache processing of cache data. FIG. 4 is a flowchart of authentication processing of the user B that uses cache data. In FIGS. 3 and 4, the solid lines indicate a processing flow, while the broken lines indicate a communication flow.

Authentication processing of the user A that includes cache processing of the cache data will be described by referring to FIG. 3. In the flowchart of FIG. 3, the authentication processing of the user A is performed and the biometric data of the user B is cached to the client 10a. The details will be described below.

At Operation S201, the user A inputs the biometric information and the user IDA to the client 10a. The client 10a acquires biometric data for verification CDA from the biometric information. At Operation S202, the client 10a transmits a confirmation request that includes the user IDA to the biometric authentication server 50 in order to confirm whether cache data of the user A is cached to any of the clients.

At Operation S203, the biometric authentication server 50 receives the confirmation request that includes the user IDA from the client 10a. The biometric authentication server 50 searches the registered data storage unit 57 based on the user IDA and confirms whether the cache data of the user A is cached to any of the clients. At Operation S204, the biometric authentication server 50 also transmits the confirmation result to the client 10a. Here, the cache data of the user A is not cached to any of the clients. Therefore, the biometric authentication server 50 transmits the confirmation result indicating that the cache data of the user A is not cached to any of the clients to the client 10a.

At Operation S205, when the client 10a receives the confirmation result indicating the cache data of the user A is not cached to any of the clients, the client 10a requests an authentication to the biometric authentication server 50 by transmitting the user IDA and biometric data for verification CDA.

At Operation S206, when the biometric authentication server 50 receives the user IDA and biometric data for verification CDA from the client 10, the biometric authentication server 50 acquires biometric data DDA of the user A from the registered data storage unit 57 based on the user IDA. The biometric authentication server 50 performs authentication processing by checking the biometric data for verification CDA against the biometric data DDA of the user A. At Operation S207, the biometric authentication server 50 determines whether the authentication succeeds. If the authentication succeeds (operation S207: Yes), the processing proceeds to Operation S208. If the authentication fails (operation S207: No), the processing proceeds to Operation S211.

At Operation S208, the biometric authentication server 50 selects a cache target to be cached to the client 10a based on the user IDA. For example, the biometric authentication server 50 selects a user who is different from the user A as a cache target user. Here, the user B is selected as a cache target user. The biometric authentication server 50 acquires biometric data DDB of the user B from the registered data storage unit 57. The biometric authentication server 50 proceeds to processing of operation S209. At operation S209, the biometric authentication server 50 generates a temporary ID that is an identifier indicating the user B together with an encryption key EK and a decryption key DK. At operation S210, the biometric authentication server 50 encrypts the biometric data DDB of the user B by using the encryption key EK. The biometric authentication server 50 proceeds to processing of operation S211.

At operation S211, the biometric authentication server 50 transmits the authentication result at operation S207 to the client 10a. If the authentication of the user A succeeds, the biometric authentication server 50 transmits cache data that includes the biometric data of the cache target user and the temporary ID to the client 10a. Here, the biometric authentication server 50 transmits the encrypted biometric data DDB of the user B, in other words, cache data CHDB that includes the encrypted biometric data EDB and the temporary ID to the client 10a. After that the biometric authentication server 50 ends the authentication processing.

At operation S212, when the client 10a receives the authentication result, the client 10a determines whether the authentication succeeds or fails. When the client 10a determines the authentication fails (operation S212: No), the client 10a transmits an authentication failure notification to the authentication result notification unit 18a (operation S213), thereby notifying the authentication result to the user A and the client 10a ends the processing. Meanwhile, when the client 10a determines the authentication succeeds (operation S212: Yes), the client 10a proceeds to operation S214. At operation S214, the client 10a caches the cache data CHDB to the cache data storage unit 15a. At operation S215, the client 10a transmits an authentication success notification to the authentication result notification unit 18a, thereby notifying the authentication result to the user A and the client 10a ends the processing.

According to the above-described authentication processing in FIG. 3, authentication processing of the user A is performed and the biometric data of the user B who is different from the user A is cached to the client 10a.

Authentication processing of the user B using cache data will be described by referring to FIG. 4. In the flowchart of FIG. 4, authentication processing of the user B is performed by using the data cached to the client 10a. Hereinafter, the specific descriptions will be made.

At operation S301, the user B inputs biometric information and a user IDB to the client 10b. The client 10b acquires biometric data for verification CDB from the biometric information. At operation S302, the client 10b transmits a confirmation request that includes the user IDB to the biometric authentication server 50 in order to confirm whether the cache data of the user B is cached to any of the clients.

At operation S303, the biometric authentication server 50 receives the confirmation request that includes the user IDB from the client 10b. The biometric authentication server 50 searches the registered data storage unit 57 based on the user IDB and confirms whether the cache data of the user B is cached to any of the clients. At operation S304, the biometric authentication server 50 transmits the confirmation result to the client 10b. Here, the biometric authentication server 50 transmits a cache destination address AD, a temporary ID, and a decryption key DK to the client 10b because the cache data of the user B is cached to the client 10a.

At operation S305, when the client 10b receives the cache destination address AD, the temporary ID and the decryption key DK, the client 10b recognizes that the biometric data of the user B is cached to the client 10a based on the cache destination address AD. The client 10b transmits an authentication request that includes biometric data for verification CDB, the temporary ID, and the decryption key DK to the client 10a.

At operation S306, the client 10a acquires cached data CHDB corresponding to the temporary ID from the cache data storage unit 15a and decrypts the biometric data DDB of the user B by using the decryption key DK. At operation S307, the client 10a performs authentication processing by checking the biometric data for verification CDB against the biometric data DDB of the user B. At operation S308, the client 10a transmits the authentication result and the temporary ID to the biometric authentication server 50 as the authentication result. At operation S309, the client 10a transmits the authentication result to the client 10b. The client 10a ends the authentication processing.

At operation S310, the biometric authentication server 50 records the authentication result and the temporary ID that are received from the client 10a as an authentication log. The biometric authentication server 50 ends the processing.

At operation S311, the client 10b transmits an authentication success notification to the authentication result notification unit 18b, thereby providing the authentication result to the user B, and the client 10b ends the processing.

According to the above-described authentication processing of FIG. 4, the client 10a performs authentication processing of the user B.

As described above, in the authentication method according to the first embodiment, another user who is different from a user who requests an authentication is determined as a cache target user and the authentication method makes a client of the user who requests the authentication cache biometric data of the cache target user. As a result, choice of biometric data to be cached may be increased and as the number of authentication requests to the biometric authentication server increases, cache data of many users may be cached to many clients. Accordingly, a load to the biometric server or that to the specific client may be effectively reduced.

Second Embodiment

An authentication method according to the second embodiment will be described. The authentication method according to the second embodiment mainly selects biometric data of another user in a group to which a user belongs as a cache target. The description will be made by referring to FIG. 5.

Figure 5:
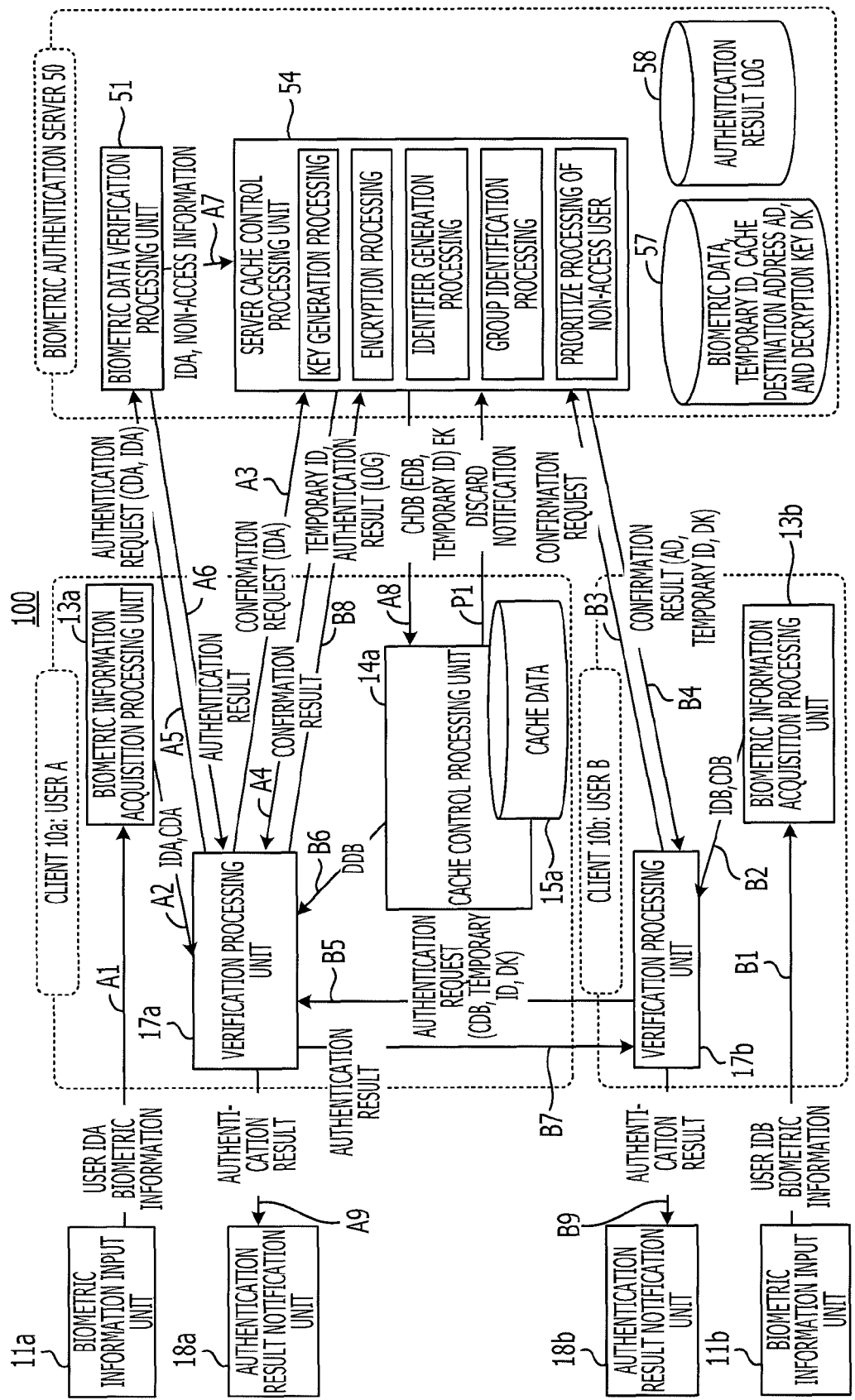
FIG. 5 is a schematic diagram illustrating an example of an authentication method according to a second embodiment.

FIG. 5 is a schematic diagram illustrating an example of an authentication method of a biometric authentication system 100 according to the second embodiment. In the example of FIG. 5, a user A requests an authentication from a client 10a and a user B requests an authentication from a client 10b as in the example of FIG. 5. Hereinafter, an authentication method of the user A and that of the user B will be described.

The authentication method of the user A will be described. Here, it is assumed that biometric data of the user A is not cached to any of the clients 10a and 10b.

As in the authentication method according to the first embodiment, the user A inputs biometric information and an user IDA to the client 10a (the arrow A1). A biometric information acquisition processing unit 13a acquires biometric data for verification CDA from the biometric information and transmits the user IDA and the biometric data for verification CDA to a verification processing unit 17a (the arrow A2).

The verification processing unit 17a requests a confirmation by transmitting the user IDA to the biometric authentication server 50 (the arrow A3). A server cache control processing unit 54 of the biometric authentication server 50 confirms whether biometric data of the user A is cached to any of the clients based on the user IDA, and transmits a confirmation result indicating the biometric data of the user A is not cached to any of the clients to the client 10a (the arrow A4).

When the verification processing unit 17a of the client 10a receives the confirmation result indicating the biometric data of the user A is not cached to any of the clients, the verification processing unit 17a requests an authentication by transmitting the user IDA and the biometric data for verification CDA to the biometric authentication server 50 (the arrow A5).

A biometric data verification processing unit 51 of the biometric authentication server 50 acquires biometric data DDA of the user A from the registered data storage unit 57 based on the user IDA. The biometric authentication server 50 performs an authentication by checking the biometric data for verification CDA against the biometric data DDA of the user A. If the authentication succeeds, the biometric data verification processing unit 51 transmits the authentication result to the client 10a (the arrow A6) and transmits the user IDA to the server cache control processing unit 54 (the arrow A7). The server cache control processing unit 54 selects cache target biometric data to be cached to the client 10a based on the user IDA.

The authentication method according to the second embodiment selects another user who belongs to a certain group as a cache target. Thus, the server cache control processing unit 54 functions as a group identification unit. The group is obtained by dividing users who access the biometric authentication server 50 into certain sets. Hereinafter, the group is referred to as a "cache target group." Here, the cache target group is set by a system administrator etc. according, for example, to known information such as an office organization and operation time. A group is set, for example, for users who could operate at substantially the same time based on operation time of each user. As a result, cache target users may be limited and biometric data of users who are known to have high usage frequencies may be preferentially cached to a client by grouping the users. Accordingly, a load of authentication processing may be efficiently shared according to the operation environment. Here, the server cache control processing unit 54 selects another user who belongs to a cache target group to which the user A belongs as a cache target.

Moreover, the server cache control processing unit 54 can preferentially select a non-access user among users who belong to the cache target group to which the user A belongs. For example, the biometric data verification processing unit 51 manages time and date of the last authentication of each user, and an authentication request from the user A triggers the biometric data verification processing unit 51 to transmit information of another user with time that elapses a certain time from the last authentication time and date of the other user to the server cache control processing unit 54 as non-access information (the arrow A7). Here, the certain time is set by the system administrator, and is set, for example, to five hours. Hence, the biometric data verification processing unit 51 functions as a last authentication time and date management unit. The server cache control processing unit 54 can preferentially select a non-access user among users who belong to the cache target group to which the user A belongs based on the non-access information. A non-access user may be appropriately determined, even when operation time of the system is irregular hours, by assuming whether the certain time elapses from the last authentication time and date as a reference to determine the non-access. As a result, a load of authentication processing may be shared according to the operation environment.

In the authentication method according to the second embodiment, it is assumed that a user B is selected as a cache target by the above-described method.

The server cache control processing unit 54 acquires biometric data DDB of the user B from the registered data storage unit 57 and encrypts the biometric data DDB of the user B by using an encryption key EK and generates a temporary ID. The server cache control processing unit 54 transmits the encrypted biometric data EDB of the user B, the temporary ID, and the encryption key EK to the client 10a (the arrow A8). Moreover, the server cache control processing unit 54 makes the registered data storage unit 57 store a cache destination address AD of the biometric data DDB of the user B (here, an address of the client 10a), the temporary ID, and the decryption key DK. A cache control processing unit 14a of the client 10a makes a cache data storage unit 15a cache the cache data CHDB of the user B. The verification processing unit 17a of the client 10a transmits an authentication result of the user A that is received from the biometric data verification processing unit 51 to the authentication result notification unit 18a (the arrow A9). Accordingly, the authentication result is provided to the user A.

In the authentication method according to the second embodiment, the biometric data verification processing unit 51 transmits the cache data CHDB of the user B by including information that indicates a usage limit. The usage limit indicates, for example, a time period during which the cache data CHDB may be used. The cache control processing unit 14a manages time when the cache data CHDB is cached to the cache data storage unit 15a (hereinafter, referred to as "cache time"). The cache control processing unit 14a discards the cache data CHDB when the usage time elapses from the cache time, and transmits a notification that the cache data CHDB is discarded to the biometric authentication server 50 together with the temporary ID (the arrow P1). Accordingly, the cache control processing unit 14a functions as a cache usage time management unit. When the biometric authentication server 50 receives the discard notification, the biometric authentication server 50 updates a cache destination address of a user corresponding to the temporary ID to a "null". As described above, setting a retention period of cache data in a client may enhance security because the cache data does not remain to be retained.

The authentication method of the user B will be described.

As described in the authentication method according to the first embodiment, the user B inputs biometric information and the user IDB to the client 10b (the arrow B1). A biometric information acquisition processing unit 13b acquires the biometric data for verification CDB from the biometric information and inputs the user IDB and the biometric data for verification CDB to the verification processing unit 17b (the arrow B2).

The verification processing unit 17b transmits the user IDB to the biometric authentication server 50 and requests a confirmation (the arrow B3). The server cache control processing unit 54 of the biometric authentication server 50 searches data in the registered data storage unit 57 based on the user IDB.

The server cache control processing unit 54 transmits the cache destination address AD, the temporary ID, and the decryption key DK to the client 10b when the biometric data of the user B is cached to the client 10a (the arrow B4).

The verification processing unit 17b of the client 10b transmits the biometric data for verification CDB, the temporary ID, and the decryption key DK to the client 10a based on the confirmation result to request an authentication (the arrow B5).

The verification processing unit 17a of the client 10a transmits the temporary ID and the decryption key DK to the cache control processing unit 14a. The cache control processing unit 14a acquires cache data of the user B from the cache data storage unit 15a by using the temporary ID. The cache control processing unit 14a decrypts the encrypted biometric data EDB in the cache data of the user B by using the decryption key DK. The cache control processing unit 14a transmits the decrypted biometric data DDB of the user B to the verification processing unit 17a (the arrow B6). The verification processing unit 17a performs an authentication by checking the biometric data for verification CDB against the biometric data DDB of the user B. The verification processing unit 17a transmits the authentication result to the client 10b (the arrow B7). The verification processing unit 17a transmits the temporary ID and the authentication result to the biometric authentication server 50 (the arrow B8). The server cache control processing unit 54 of the biometric authentication server 50 stores the authentication result in the log data storage unit 58 as a log. Moreover, the verification processing unit 17b of the client 10b transmits the authentication result of the user B to the authentication result notification unit 18b (the arrow B9). Accordingly, the authentication result is provided to the user B.

In the authentication method according to the above-described second embodiment; information that indicates the usage limit included in the cache data CHDB of the user B is the usage time of the cache data CHDB; however the embodiment is not limited to this. Instead, information that indicates the usage limit may be the number of times that the cache data CHDB may be used. In this case, the cache control processing unit 14a counts the number of times the cache data CHDB is used and discards the cache data CHDB when the number of times the cache data is used exceeds the number of available times. The cache control processing unit 14a transmits a discard notification indicating the cache data CHDB is discarded to the biometric authentication server 50 together with the temporary ID. Hence, the cache control processing unit 14a functions as a unit to manage the number of times the cache is used. The biometric authentication server 50 updates a cache destination address corresponding to the temporary ID to a "null". Security may be enhanced because the cache data is not kept retained as described above.

Third Embodiment

An authentication method according to the third embodiment will be described. In the authentication method according to the third embodiment, mainly a relationship between a cache target user and a user who uses a cache destination client is defined as a cache target group. Hereinafter, specific descriptions will be made by referring to FIGS. 6 to 9.

Figure 6:
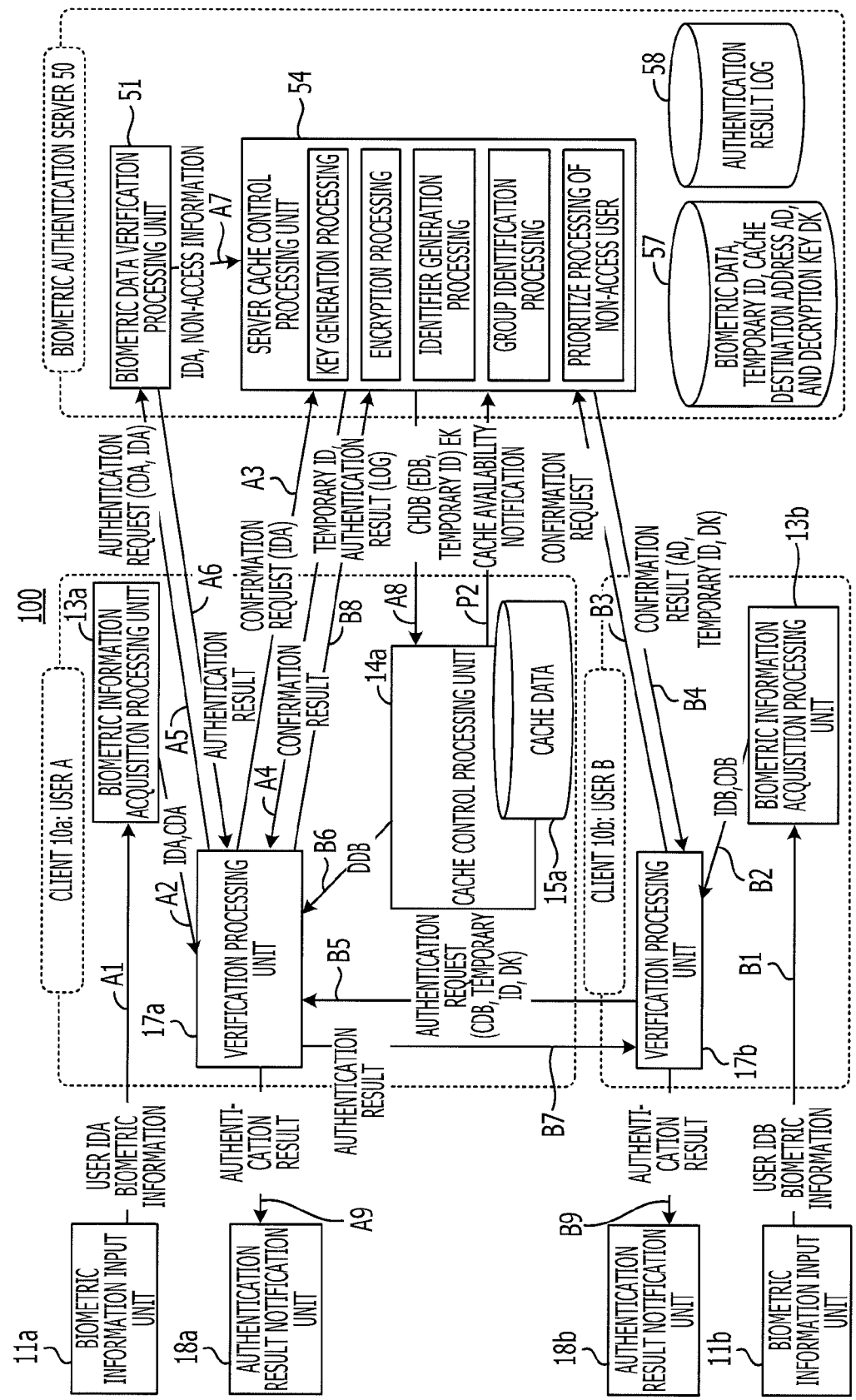
FIG. 6 is a schematic diagram illustrating an example of an authentication method according to a third embodiment.

FIG. 6 is a schematic diagram illustrating an example of an authentication method according to the third embodiment.

In the example of FIG. 6, an administrative user A1 requests an authentication through a client 10a, while a user A_001 performs an authentication request through a client 10b. Hereinafter, an authentication method of the administrative user A1 and that of the user A_001 will be described.

The authentication method of the administrative user A1 will be described. It is assumed that biometric data of the administrative user A1 is not cached to any of clients 10a and 10b. Moreover, substantially the same reference numerals that are used for the user A described in the first and the second embodiments will be used for reference numerals that indicate information relating to the administrative user A1. Furthermore, substantially the same reference numerals that are used for the user B described in the first and the second embodiments will be used for reference numerals that indicate information relating to the user A_001.

As described in the authentication method according to the second embodiment, the administrative user A1 inputs biometric information and a user IDA to the client 10a (the arrow A1). A biometric information acquisition processing unit 13a acquires biometric data for verification CDA from the biometric information and transmits the user IDA and the biometric data for verification CDA to a verification processing unit 17a (the arrow A2).

The verification processing unit 17a requests a confirmation by transmitting the user IDA to the biometric authentication server 50 (the arrow A3). A server cache control processing unit 54 of the biometric authentication server 50 confirms whether biometric data of the user A is cached to any of the clients based on the user IDA, and transmits a confirmation result indicating the biometric data of the user A is not cached to any client to the client 10a (the arrow A4).

When the verification processing unit 17a of the client 10a receives a confirmation result indicating the biometric data of the user A is not cached to any of the clients, the verification processing unit 17a requests an authentication by transmitting the user IDA and the biometric data for verification CDA to the biometric authentication server 50 (the arrow A5).

A biometric data verification processing unit 51 of the biometric authentication server 50 acquires biometric data DDA of the administrative user A1 from the registered data storage unit 57 based on the user IDA. The biometric authentication server 50 performs authentication by checking the biometric data for verification CDA against the biometric data DDA of the administrative user A1. If the authentication succeeds, the biometric data verification processing unit 51 transmits the authentication result of the administrative user A1 to the client 10a (the arrow A6) and transmits the user IDA to the server cache control processing unit 54 (the arrow A7).

As described in the first embodiment, the server cache control processing unit 54 selects biometric data to be cached to the client 10a based on the user IDA. For example, the server cache control processing unit 54 identifies a cache target group to which the administrative user A1 belongs, and selects another user who belongs to the cache target group as a cache target.

The authentication method according to the third embodiment defines a dependency relationship between a cache target user and a cache destination client user by a group. The server cache control processing unit 54 selects another user who belongs to a group that is dependent of the group to which the administrative user A1 belongs as a cache target. The group is set, for example, by an office organization. An example of group identification information that indicates the dependency relationship is illustrated in FIGS. 7A, 7B, and 7C.

FIG. 7A illustrates an example of a relationship between a user name and a group to which the user belongs.

FIG. 7A illustrates that the administrative user A1 belongs to "group A" and "group A administrator" while the user A_001 belongs to "group A."

FIG. 7B illustrates an example of a cache available group. The cache available group is a group of users to which biometric data of another user selected as a cache target may be cached.

FIG. 7B illustrates an administrator of the group A administrator belongs to the cache available group. In other words, biometric data of another user may be cached to a client of a user who belongs to the administrator of the group A. Thus, biometric data of another user may be cached to the client 10a of the administrative user A1, because the administrative user A1 belongs to the group A administrator.

FIG. 7C illustrates an example of a relationship between an administrative group and a dependent group. The dependent group is a group of users that is cached to clients of users who belong to the administrative group.

FIG. 7C illustrates the group A as a dependent group for the group A administrator that is the administrative group. In other words, biometric data of the user in the group A is a cache target that is cached to a client of a user who belongs to the group A administrator.

The server cache control processing unit 54 selects, for example, the user A_001 who belongs to the group A as a cache target user by using the above-described group identification information. Accordingly, biometric data of a user who belongs to a group that is dependent on a specific administrative group may be cached to a client of a user who belongs to the specific administrative group. Biometric data of a subordinate may be cached to a client of the superior by forming a group of users who manages subordinates in terms of the office organization and a group of users who are managed and dependent on the group of users who manages the subordinates. As a result, a load of the authentication processing may be shared while clarifying responsibility of the cache data.

According to the third embodiment, when the server cache control processing unit 54 selects biometric data to be cached, the server cache control processing unit 54 determines whether biometric data of a client who requests an authentication may be cached.

For example, the server cache control processing unit 54 has cache availability attribute information that indicates whether biometric data may be cached for each client. The server cache control processing unit 54 determines whether the biometric data is cached by determining the cache availability attribute for a client that requests an authentication. FIG. 8 illustrates an example of cache availability attribute information.

As illustrated in FIG. 8, the cache availability information has a user name, client information, and a cache availability attribute. The client information is indicated, for example, by an IP address of a client. Moreover, the cache availability attribute is indicated by "available" when cache is available, while the cache availability attribute is indicated by "unavailable" when cache is unavailable. In the example of FIG. 8, the administrative user A1 has three clients (aaa.bbb.ccc.10 to aaa.bbb.ccc.12) and cache is unavailable for the client indicated by "aaa.bbb.ccc.12."

Thus, the server cache control processing unit 54 determines a cache target user when the client 10a of the administrative user A1 that requests an authentication has the IP address either "aaa.bbb.ccc.10" or "aaa.bbb.ccc.11." In other words, the server cache control processing unit 54 makes the client 10a to cache biometric data of the cache target user. Meanwhile, when the client 10a has the IP address of "aaa.bbb.ccc.12," the server cache control processing unit 54 does not determine a cache target user and does not make the client 10a to cache biometric data of another user. In other words, according to the method, availability of cache may be set for each client. As described above, a load of authentication processing may be efficiently shared according to the operation environment by limiting cache processing based on cache availability attributes.

Each client transmits a cache availability notification that indicates own cache availability to the biometric authentication server 50. The biometric authentication server 50 may update the cache availability attribute information based on the cache availability notification. For example, when the administrative user A1 desires to make cache availability of the client 10a to unavailable, the administrative user A1 transmits a cache availability notification that indicates making cache availability of the client 10a unavailable to the biometric authentication server 50 through the client 10a (the arrow P2 in FIG. 6). For example, the cache control processing unit 14a of the client 10a transmits the cache availability notification to the biometric authentication server 50. Thus, the cache control processing unit 14a functions as a cache availability notification unit. When the biometric authentication server 50 receives the cache availability notification, the biometric authentication server 50 updates the cache availability attribute information. For example, when an address of the client 10a is indicated by "aaa.bbb.ccc.10," the biometric authentication server 50 updates the cache availability attribute corresponding to the "aaa.bbb.ccc.10" by changing from "available" to "unavailable." When the client 10a stores the cache data, the biometric authentication server 50 deletes the temporary ID, the address and the decryption key for the cache data. The client 10a deletes the cache data stored therein when the client 10a transmits the cache availability notification to the biometric authentication server 50. As a result, biometric data is not cached to the client 10a.

For example, when the administrative user A1 desires to make the cache availability available, the administrative user A1 transmits a cache availability notification indicating to that effect to the biometric authentication server 50 through the client 10a. When the biometric authentication server 50 receives the cache availability notification, the biometric authentication server 50 updates the cache availability attribute information for the "aaa.bbb.ccc.10" by changing from "unavailable" to "available." As a result, biometric data is cached to the client 10a.

According to the above-described manner, a client who is set to be cache available may be temporarily changed to cache unavailable, or a client who is set to be cache unavailable may be temporarily changed to cache available. Thus, a load of authentication processing may be efficiently shared even for an irregular operation. Here, the client 10a is assumed to be cache available.

The server cache control processing unit 54 acquires biometric data DDB of the user A_001 who is selected as a cache target user from the registered data storage unit 57, encrypts the biometric data DDB of the user A_001 by using the encryption key EK and generates the temporary ID. The server cache control processing unit 54 transmits encrypted biometric data EDB of the user A_001, the temporary ID, and an encryption key EK to the client 10a (the arrow A8). Moreover, the server cache control processing unit 54 makes the registered data storage unit 57 store a cache destination address AD of the biometric data DDB of the user A_001 (here, an address of the client 10a), the temporary ID, and the decryption key DK. The cache control processing unit 14a of the client 10a makes a cache data storage unit 15a store the cache data CHDB of the user A_001. The verification processing unit 17a transmits an authentication result of the user A that is received from the biometric data verification processing unit 51 to the authentication result notification unit 18a (the arrow A9). Accordingly, the authentication result is provided to the user A.

When biometric data of a user who is selected as a cache target is cached to a plurality of clients, the server cache control processing unit 54 may manage the number of clients.

For example, the server cache control processing unit 54 sets substantially the maximum number of cache destination clients of biometric data of a user who is selected as a cache target. The server cache control processing unit 54 caches biometric data of the user when the number of cache destination clients of the biometric data of the user does not exceed substantially the maximum value and the biometric data of the user is not cached to the client that requests an authentication.

For example, the server cache control processing unit 54 determines whether the number of cache destination clients of the biometric data of the user A_001 does not exceed substantially the maximum value and the biometric data of the user A_001 is not cached to the client 10a that requests an authentication. When the server cache control processing unit 54 determines the number of cache destination clients of the biometric data of the user A_001 does not exceed substantially the maximum value and the biometric data of the user A_001 is not cached to the client 10a that requests an authentication, the server cache control processing unit 54 caches the biometric data of the user A_001 to the client 10a. Accordingly, the biometric data of the user A_001 may be cached to the plurality of clients. Hence, the server cache control processing unit 54 functions as a unit to manage the number of cache destination clients.

The server cache control processing unit 54 determines priority of cache destinations when biometric data of a user is cached to a plurality of clients. When a cache target user requests a confirmation later, the server cache control processing unit 54 determines a client that the cache target user accesses based on the priority of the cache destinations. In other words, the client with substantially the highest cache priority is determined. The priority of cache destinations may be determined according, for example, to cached time or operation states of the clients, or may be determined for each client beforehand. FIG. 9 illustrates an example of cache destination client information to which priority is assigned.

FIG. 9 illustrates a relationship among, a user name, a temporary ID, a decryption key, a cache destination address, and priority. In the example of FIG. 9, biometric data of the user A_001 is cached to two clients of the administrative user A1. The priority of the client indicated by "aaa.bbb.ccc.10" is "1", while the priority of the client indicated by "aaa.bbb.ccc.11" is "2." Thus, when the user A_001 requests a confirmation, the server cache control processing unit 54 transmits the cache destination address "aaa.bbb.ccc.10," the temporary ID and the decryption key corresponding to the cache destination address to the user A_001. If a client of the cache destination address "aaa.bbb.ccc.10" is unavailable, the server cache control processing unit 54 transmits the cache destination address "aaa.bbb.ccc.11," the temporary ID, and the decryption key corresponding to the cache destination address to the user A_001. Accordingly, even if a certain client to which biometric data is cached is unavailable, another client may be used instead and a load may be shared according to operation states of clients.

Continuously descriptions of FIG. 6, the authentication method of the user A_001, will be described.

As described in the authentication method according to the first embodiment, the user A_001 inputs biometric information and the user IDB to the client 10b (the arrow B1). A biometric information acquisition processing unit 13b acquires the biometric data for verification CDB from the biometric information and inputs the user IDB and the biometric data for verification CDB to the verification processing unit 17b (the arrow B2).

The verification processing unit 17b transmits the user IDB to the biometric authentication server 50 (the arrow B3). The server cache control processing unit 54 of the biometric authentication server 50 searches data in the registered data storage unit 57 based on the user IDB. The server cache control processing unit 54 transmits the cache destination address AD, the temporary ID, and the decryption key DK to the client 10b when the biometric data of the user A_001 is cached to the client 10a (the arrow B4).

The verification processing unit 17b of the client 10b transmits the biometric data for verification CDB, the temporary ID, and the decryption key DK to the client 10a (the arrow B5).

The verification processing unit 17a of the client 10a transmits the temporary ID and the decryption key DK to the cache control processing unit 14a. The cache control processing unit 14a acquires cache data of the user A_001 from the cache data storage unit 15a by using the temporary ID. The cache control processing unit 14a decrypts the encrypted biometric data EDB in the cache data of the user A_001 by using the decryption key DK. The cache control processing unit 14a transmits the decrypted biometric data DDB of the user A_001 to the verification processing unit 17a (the arrow B6). The verification processing unit 17a performs an authentication by checking the biometric data for verification CDB against the biometric data DDB of the user A_001. The verification processing unit 17a transmits the authentication result to the client 10b (the arrow B7). The verification processing unit 17a transmits the temporary ID and the authentication result to the biometric authentication server 50 (the arrow B8). The server cache control processing unit 54 of the biometric authentication server 50 stores the authentication result in the log data storage unit 58 as a log. Moreover, the verification processing unit 17b of the client 10b transmits the authentication result of the user A_001 to the authentication result notification unit 18b (the arrow B9). Accordingly, the authentication result is provided to the user A_001.

Fourth Embodiment

An authentication method according to the fourth embodiment will be described. The authentication method according to the fourth embodiment mainly changes an operation environment according to an access state. Hereinafter, specific descriptions will be made by referring to FIGS. 10 and 11.

Figure 10:
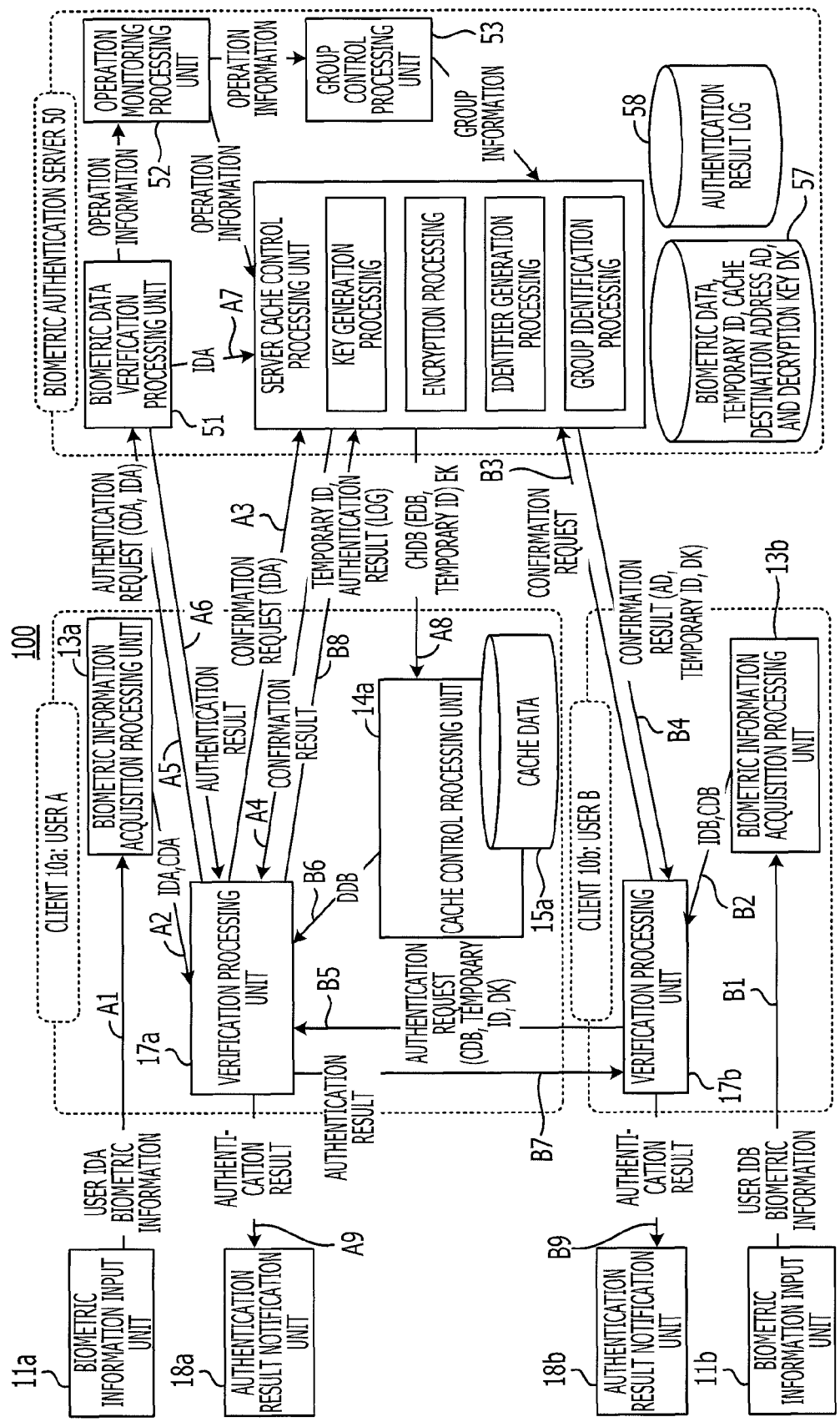
FIG. 10 is a schematic diagram illustrating an example of an authentication method according to a fourth embodiment.

FIG. 10 is a schematic diagram illustrating an example of the authentication method according to the fourth embodiment.

The authentication flow of the user A indicated by the arrows A1 to A5 is substantially the same as that of the first embodiment, and will not be described.

A biometric data verification processing unit 51 of a biometric authentication server 50 acquires biometric data DDA of a user A from a registered data storage unit 57 based on a user IDA. The biometric authentication server 50 performs authentication processing by checking the biometric data for verification CDA against the biometric data DDA of the user A. If the authentication succeeds, the biometric data verification processing unit 51 transmits the result of successful authentication of the user A to the client 10*a* (the arrow A6) and transmits the user IDA to the server cache control processing unit 54 (the arrow A7).

According to the authentication method according to the fourth embodiment, an operation monitoring processing unit 52 starts caching biometric data to a client that requests an authentication when the number of clients that request an authentication that are measured from reference time exceeds a certain value. Hereinafter, specific descriptions will be made.

The operation monitoring processing unit 52 of the biometric authentication server 50 statistically manages authentication time for each client. The operation monitoring processing unit 52 calculates the number of clients that requests an authentication from the reference time based on the authentication time, when the number of clients exceeds the certain number of clients, the operation monitoring processing unit 52 transmits operation information indicating that the number of clients exceeds the certain number of clients to the server cache control processing unit 54. Thus, the operation monitoring processing unit 52 functions as a measurement unit. When the server cache control processing unit 54 receives the operation information, the server cache control processing unit 54 starts caching biometric data to the client that requests an authentication. For example, when reference time is 4:00 and a reference value is 35, if the number of clients that request authentication exceeds 35, the operation monitoring processing unit 52 transmits operation information that indicates to that effect to the server cache control processing unit 54. When the server cache control processing unit 54 receives the operation information, the server cache control processing unit 54 starts caching biometric data to the client that requests an authentication. As a result, caching may be automatically started at timing when accesses from clients are congested, and a load of authentication processing is shared according to the access state.

Here, it is assumed that caching is already started when the client 10*a* requests an authentication. Thus, when the server cache control processing unit 54 receives the user IDA, the server cache control processing unit 54 selects biometric data to be cached to the client 10*a*. As a method to select a cache target user, the server cache control processing unit 54 selects biometric data of another user who is different from the user A of the client 10*a* as a cache target.

In the authentication method according to the fourth embodiment, the server cache control processing unit 54 selects a cache target user based on a network distance between clients and an authentication rate of each user.

The method to select a cache target user based on the network distance between clients will be described. Here, the network distance indicates a length of a communication transmission line between the clients. The server cache control processing unit 54 selects a user of a client that the distance from a client that requests an authentication is shorter than a certain distance as a cache target user. Shorter than the certain distance indicates, for example, the clients are in the same network segment.

For example, the group control processing unit 53 of the biometric authentication server 50 manages a network distance between the clients. For example, the group control processing unit 53 has group information (hereinafter, referred to as "network group information") that is obtained by grouping a plurality of clients by each network segment. FIG. 11A illustrates an example of network group information. As illustrated in FIG. 11A, a client of the user A and a client of the user B belong to a "group S" that is the same network segment. A network distance between clients that belong to the same network segment is closer compared with a network distance between clients that belong to different network segments. The group control processing unit 53 transmits the network group information to the server cache control processing unit 54. Accordingly, the group control processing unit 53 functions as a network distance management unit.

The server cache control processing unit 54 can preferentially select a user of a client that belongs to the same group as a client that requests an authentication based on the network group information. Here, the client 10*a* of the user A and the client 10*b* of the user B belong to the same group S. Hence, the server cache control processing unit 54 may select biometric data of the user B as a cache target to be cached to the client 10*a*. According to the method, a network distance between a client that the cache target user uses and a cache destination client may be closer as much as possible, thereby reducing time of communication between the clients when an authentication is requested to the client.

A method to select a cache target user based on an authentication rate of each user will be described.

The operation monitoring processing unit 52 of the biometric authentication server 50 calculates an authentication success rate for each user by using an authentication result log (hereinafter, referred to as "authentication log"). FIG. 11B illustrates an example of the authentication log. The authentication log records a user name, an authentication result, and time when an authentication is performed. In FIG. 11B, "success" indicates an authentication succeeds, and "failure" indicates an authentication fails. The operation monitoring processing unit 52 calculates an authentication rate for each user based on the authentication log. FIG. 11C illustrates an authentication rate for each user. The operation monitoring processing unit 52 transmits information of a user having an authentication rate lower than a certain reference value to the group control processing unit 53 as operation information. Thus, the operation monitoring processing unit 52 functions as an authentication rate management unit. The group control processing unit 53 transmits group information (hereinafter, referred to as "low authentication rate group") that are made up of users with an authentication rate lower than the certain reference value to the server cache control processing unit 54. The server cache control processing unit 54 can preferentially select a user who belongs to the low authentication rate group as a cache target when selecting a cache target user.

In FIG. 11C, for example, when a reference value of an authentication rate is 0.48, the user B has lower authentication rate than the reference value. Therefore, the operation monitoring processing unit 52 transmits information of the user B to the server cache control processing unit 54 through the group control processing unit 53.

In the authentication method according to the fourth embodiment, it is assumed that the user B is selected as a cache target user by the above-described method.

The server cache control processing unit 54 transmits encrypted biometric data EDB of the user B, a temporary ID, and an encryption key EK to the client 10*a* (the arrow A8). Moreover, the server cache control processing unit 54 makes the registered data storage unit 57 store a cache destination address AD of the biometric data DDB of the user B (here, an address of the client 10*a*), the temporary ID, and a decryption key DK. A cache control processing unit 14*a* of the client 10*a* makes a cache data storage unit 15*a* cache cache data CHDB of the user B.

The authentication flow of the user B indicated by the arrows B1 to B9 is substantially the same as that of the first embodiment, and will not be described.

The authentication method according to the fourth embodiment selects a cache target user based on an authentication rate of each user. However, the method to select a cache target user according to an authentication status of a user does not limit to the above-described method. Instead of, or in addition to the above-described method, a cache target user may be selected based, for example, on an access trend of users or how much authentications are concentrated. Hereinafter, the method will be described.

A method to select a cache target user based on an access trend of users will be described.

The operation monitoring processing unit 52 of the biometric authentication server 50 statistically manages authentication time of each user and calculates a period of time on which authentication requests to the biometric authentication server 50 are concentrated. For example, the operation monitoring processing unit 52 calculates a period of time in which the certain number of authentications or more is requested for each user as a period of time on which authentication requests are concentrated. When a user (for example, a user A) requests an authentication, the operation monitoring processing unit 52 transmits information of another user on (for) whom authentication requests are concentrated in a period of time after a certain time elapses from a time when the authentication is requested based on the calculation result to the server cache control processing unit 54 as operation information. Hence, the operation monitoring processing unit 52 functions as an authentication time management unit and a user operation period of time calculation unit. The server cache control processing unit 54 selects the other user as a cache target user. According to the method, another user who statistically requests authentications more frequently later compared with a user may be cached. Accordingly, cache data may be efficiently used.

A method to select a cache target user based on how much user authentications are concentrated will be described.

The operation monitoring processing unit 52 of the biometric authentication server 50 statistically manages authentication time of each user. The operation monitoring processing unit 52 transmits information of authentication time of each user to the group control processing unit 53 as operation information. The group control processing unit 53 transmits group information (hereinafter, referred to as "period of time authentication concentration group") obtained by grouping users that authentications are concentrated on the same period of time to the server cache control processing unit 54. When the server cache control processing unit 54 selects a cache target user, the server cache control processing unit 54 can preferentially select a user who belongs to the same period of time authentication concentration group as a user who requests an authentication. Accordingly, users that the authentication concentrates on the same period of time may be set in the same group automatically without setting a group beforehand. As a result, a load of authentication processing may be shared according to how much authentications are concentrated on.

Alternative Embodiments

Alternative embodiments of the above-described embodiments will be described.

A first alternative embodiment will be described. According to the first alternative embodiment, when a cache destination client is unavailable, cache data cached to the cache destination client is re-cached to another cache destination client. Hereinafter, specific descriptions will be made.

The operation monitoring processing unit 52 monitors an operation state of a cache destination client, in other words, whether the cache destination client is unavailable. When the operation monitoring processing unit 52 determines the cache destination client is unavailable, the operation monitoring processing unit 52 resets a user corresponding to biometric data that is cached to the cache destination client to selectable as a cache target user through a registered data input and output unit 56. Thus, the operation monitoring processing unit 52 functions as an operation state monitoring unit.

When the server cache control processing unit 54 selects a cache target user, the server cache control processing unit 54 can preferentially select a user who is reset to selectable. Accordingly, even when cache data that is cached to a client is unavailable for some reasons, the cache data may be cached to another user. As a result, cache data may be automatically reallocated even in an operation environment in which operation periods of time of clients are sparsely-distributed.

A second alternative embodiment will be described. According to the second alternative embodiment, cache data cached to a cache destination client is updated according to time elapsed since the cache data is cached. Hereinafter, specific descriptions will be made.

A cache control processing unit 14 of the cache destination client manages time and date when cache data is cached. The cache control processing unit 14 determines whether certain time elapsed since the cache date. When the cache control processing unit 14 determines the certain time elapses, the cache control processing unit 14 requests an update of the cache data to the biometric authentication server 50. Thus, the cache control processing unit 14 functions as an update request unit. The server cache control processing unit 54 of the biometric authentication server 50 assumes a user corresponding to biometric data of cache data that is determined to elapse the certain time since the cache date as a cache target user. In other words, the server cache control processing unit 54 reacquires biometric data of the user from the registered data storage unit 57. The server cache control processing unit 54 encrypts the reacquired biometric data by using a newly generated encryption key and generates a new temporary ID. The server cache control processing unit 54 transmits the encrypted biometric data, the temporary ID and the encryption key that are generated as described above to the cache destination client as new cache data. Thus, the server cache control processing unit 54 functions as an update unit.

The cache control processing unit 14a of the cache destination client makes the cache data storage unit 15 store the new cache data and updates time and date of the cache. Accordingly, security for cache data of a cache destination client that is almost always in an operation state is enhanced and cache data may be securely retained for a long period.

A third alternative embodiment will be described. According to the third alternative embodiment, an access from a cache target user to a cache destination client is simplified. Hereinafter, specific descriptions will be made.

When a cache control processing unit 14 of a cache destination client receives a temporary ID and a decryption key of a cache target user, the cache control processing unit 14 retains the temporary ID and the decryption key of the cache target user even after a user is authenticated by the cache data. Moreover, the biometric authentication server 50 notifies cache usage limit to verification processing units 17 of both the cache destination client and the client of the cache target user. The verification processing units 17 of the both clients function as a cache usage limit retaining unit. After that, when the client of the cache target user requests an authentication, the verification processing units 17 of the client requests an authentication directly to the cache destination client within a range of the cache usage limit without requesting a confirmation to the biometric authentication server 50. In other words, the client of the cache target user transmits data for verification to the cache destination client directly. The cache destination client performs verification based on the data for verification and transmits the authentication result to the client of the cache target user. Whenever the processing is performed, the number of usage is updated in both the cache destination client and client of the cache target user. When the number of usage exceeds the cache usage limit, the client of the cache target user requests the confirmation to the biometric authentication server 50 again.

As described above, making cache data of a cache destination client available without through the biometric authentication server 50 in a certain usage limit may further reduce a communication amount when cache data is used and reduce a load of processing in the biometric authentication server 50.

According to the above-disclosed system, choice of biometric data to be cached may be increased, and as the number of authentication requests to the biometric authentication server increases, cache data of more users may be cached to more clients. Accordingly, a load to the biometric authentication server may be effectively reduced.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware that executes instructions or software, for example, computing hardware (i.e., computing apparatus), such as (in a non-limiting example) any computer or computer processor that can store, retrieve, receive, process and/or output data and/or communicate (network) with other computers. According to an aspect of an embodiment, the described features, functions, operations, and/or benefits can be implemented by and/or use computing hardware and/or software. For example, the server 50 and the clients 10n can comprise a computing controller (CPU) (e.g., a hardware logic circuitry based computer processor that processes or executes instructions, namely software/program), computer readable media, transmission communication interface (network interface), input device (e.g., biometric information input unit 11) and/or an output device, for example, a display device for displaying authentication result notifications, and which can be in communication among each other through one or more data communication buses. In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implements or executes instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A biometric authentication system comprising:
   a biometric authentication server computer; and
   a plurality of client computers that are coupled through a network and configured to process an authentication request from a user of a client computer,
   wherein the biometric authentication server computer is configured to
      determine a cache target user, wherein the cache target user is another user who is different from the user who requested the authentication to the biometric authentication server computer;
      generate an identifier that indicates the cache target user;
      transmit biometric data of the cache target user and the identifier to the client computer of the user who requested the authentication;
      determine whether biometric data of any cache target user with a corresponding identifier are available on any client computers;
      measure a number of client computers that performed an authentication request to the biometric authentication server; and
      determine the cache target user when the number of client computers measured by the measurement unit exceeds a certain number of client computers; and wherein the client computer is configured to cache the biometric data of the cache target user and the identifier that are received from the biometric authentication server computer.

2. The biometric authentication system according to claim 1,
wherein the biometric authentication server computer is further configured to identify a group to which the user who requested the authentication belongs; and
determine as the cache target user another user who belongs to the group.

3. The biometric authentication system according to claim 1,
wherein the biometric authentication server computer is further configured to
provide cache availability attribute information that indicates cache availability of biometric data of the client computer; and
determine cache availability of the client computer based on the cache availability attribute information and determines the cache target user when the client computer is determined to be available for cache.

4. The biometric authentication system according to claim 1, the biometric authentication server computer further configured to
manage a number of client computers to which biometric data of a certain user is cached; and
determine priority of a plurality of the client computers to which biometric data of the certain user is cached; and
determine a client computer that performs authentication processing according to the priority among the plurality of client computers for which priority is determined when the certain user requests an authentication.

5. The biometric authentication system according to claim 1, the biometric authentication server computer further configured to
identify a group to which a user of biometric data that is to be cached to the client computer of the user who requested the authentication belongs; and
determine a user who belongs to the group as the cache target user.

6. The biometric authentication system according to claim 1, the biometric authentication server computer further configured to manage a final authentication time and/or date of each user; and
determine as the cache target user an other user with authentication time and/or date elapsed from a final authentication time and/or date of the other user.

7. The biometric authentication system according to claim 1, the biometric authentication server computer further configured to
manage authentication time of each user;
calculate a time zone on which authentication requests from users are concentrated; and
determine as the cache target user, when an authentication is requested, a user for whom authentication requests are concentrated in a time zone after a certain time has elapsed from time of the authentication request.

8. The biometric authentication system according to claim 1, the biometric authentication server computer further configured to
manage an authentication success rate for each user; and
determine as the cache target user a user with a success rate lower than a certain success rate.

9. The biometric authentication system according to claim 1, the biometric authentication server computer further configured to manage a network distance between client computers; and
determine as the cache target user a user of a client computer which network distance from the client computer that performed the authentication request is shorter than a certain distance.

10. The biometric authentication system according to claim 1, the biometric authentication server computer further configured to
monitor an operation state of a cache destination client computer to which biometric data is to be cached; and
determine as the cache target user a user of a cache destination client computer for an available operation state.

11. The biometric authentication system according to claim 1, the client computer further configured to
manage cache time and/or date when biometric data is cached; and
transmit an update request to the biometric authentication server computer when a certain time elapses from the cache time and/or date;
wherein the biometric authentication server computer additionally encrypts biometric data of a user corresponding to the biometric data cached to a client computer and generates a new identifier, and transmits updated encrypted biometric data and the identifier to the client computer.

12. The biometric authentication system according to claim 1, wherein a client computer further configured to
retain a cache usage limit that indicates a usage limit of cached biometric data;
wherein the client computer of the cache target user retains an address of a cache destination client and performs an authentication request directly to the cache destination client within a range of the cache usage limit when the cache target user performs an authentication request.

13. A authentication server computer configured to store a plurality of pieces of biometric data, that is coupled to a plurality of client computers through a network, and processes an authentication request by checking biometric data for verification collected from a user of a client against the biometric data when the user requests the authentication through a client of the computer; the authentication server computer comprising:
one or more computing machines configured to
determine a cache target user, wherein the cache target user is another user who is different from the user who requested the authentication to the authentication server computer;
generate an identifier of the cache target user;
transmit biometric data of the cache target user and the identifier to the client computer of the user that requested the authentication;
determine whether biometric data of any cache target user with a corresponding identifier are available on any of the client computers;
measure a number of client computers that performed an authentication request to the authentication server computer; and
determine the cache target user when the number of client computers measured by the measurement unit exceeds a certain number of client computers.

14. A biometric authentication method executed by an authentication server computer that includes a storage unit configured to store a plurality of pieces of biometric data, is coupled to a plurality of client computers through a network, and performs authentication request processing for a user of a client by checking biometric data for verification collected from a user against the biometric data, the method comprising:

determining by the authentication server computer a cache target user, wherein the cache target user is another user who is different from the user who performed the authentication request to the authentication server computer;

generating an identifier for the cache target user;

transmitting by the authentication server computer biometric data of the cache target user and the identifier to the client computer of the user that performed the authentication request to the authentication server computer;

measuring a number of client computers that performed an authentication request to the authentication server; and determining the cache target user when the number of client computers measured by the measurement unit exceeds a certain number of client computers.

* * * * *